US012552181B2

(12) United States Patent
Herrmann et al.

(10) Patent No.: US 12,552,181 B2
(45) Date of Patent: Feb. 17, 2026

(54) INKJET PRINTER WITH IMAGE DRYER FOR IMPROVING INK IMAGE QUALITY IN AN AQUEOUS INKJET PRINTER

(71) Applicant: Xerox Corporation, Norwalk, CT (US)

(72) Inventors: Douglas K. Herrmann, Webster, NY (US); Seemit Praharaj, Webster, NY (US); Jason M. LeFevre, Penfield, NY (US); Varun S. Sambhy, Pittsford, NY (US); Palghat Ramesh, Pittsford, NY (US); Anthony S. Condello, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 149 days.

(21) Appl. No.: 18/403,343

(22) Filed: Jan. 3, 2024

(65) Prior Publication Data

US 2025/0214352 A1 Jul. 3, 2025

(51) Int. Cl.

| | |
|---|---|
| ***B41J 11/00*** | (2006.01) |
| ***B41J 13/08*** | (2006.01) |
| ***B65H 5/04*** | (2006.01) |

(52) U.S. Cl.

CPC ............ *B41J 11/002* (2013.01); *B41J 13/08* (2013.01); *B65H 5/04* (2013.01); *B65H 2403/20* (2013.01)

(58) Field of Classification Search

CPC ...... B41J 11/002; B41J 13/08; B41J 11/0022; B41J 11/007; B65H 5/04; B65H 2403/20

See application file for complete search history.

(56) References Cited

U.S. PATENT DOCUMENTS

| | | | | |
|---|---|---|---|---|
| 10,350,912 | B1 * | 7/2019 | Herrmann | F26B 3/283 |
| 2019/0291467 | A1 * | 9/2019 | LeFevre | B41J 3/543 |

* cited by examiner

*Primary Examiner* — Bradley W Thies

(74) *Attorney, Agent, or Firm* — Maginot Moore & Beck LLP

(57) ABSTRACT

An inkjet printer has an image dryer that moves printed media sheets vertically through the dryer from an entrance to the image dryer to an exit from the image dryer that is higher than the entrance. The vertical configuration of the image dryer enables the inkjet printer to increase the dwell time of the printed sheets in the image dryer without increasing a footprint of the inkjet printer.

20 Claims, 4 Drawing Sheets

INKJET PRINTER WITH IMAGE DRYER FOR IMPROVING INK IMAGE QUALITY IN AN AQUEOUS INKJET PRINTER

TECHNICAL FIELD

This disclosure relates generally to devices that produce aqueous ink images on media, and more particularly, to the production of ink images on coated media in such devices.

BACKGROUND

Inkjet imaging devices, also known as inkjet printers, eject liquid ink from printheads to form images on an image receiving surface. The printheads include a plurality of inkjets that are arranged in an array. Each inkjet has a thermal or piezoelectric actuator that is coupled to a printhead controller. The printhead controller generates firing signals that correspond to digital data content corresponding to images. The actuators in the printheads respond to the firing signals by expanding into an ink chamber to eject ink drops onto an image receiving surface and form an ink image that corresponds to the digital image content used to generate the firing signals. The image receiving surface is usually a continuous web of media material or a series of media sheets.

Inkjet printers used for producing color images typically include multiple printhead assemblies. Each printhead assembly includes one or more printheads that usually eject a single color of ink. In a typical inkjet color printer, four printhead assemblies are positioned in a process direction with each printhead assembly ejecting a different color of ink. The four ink colors most frequently used are cyan, magenta, yellow, and black. The common nomenclature for such printers is CMYK color printers. Some CMYK printers have two printhead assemblies that print each color of ink. The printhead assemblies that print the same color of ink are offset from each other by one-half of the distance between adjacent inkjets in the cross-process direction to double the number of pixels per inch density of a line of the color of ink ejected by the printheads in the two assemblies. As used in this document, the term "process direction" means the direction of movement of the image receiving surface as it passes the printheads in the printer and the term "cross-process direction" means a direction that is perpendicular to the process direction in the plane of the image receiving surface.

Image quality in color inkjet printers depends upon on many factors such as ink chemistry, printhead technology, thermals in the vicinity of the ink drops, print process setpoints, airflows, and ink-to-media spreading and drying interactions. One issue that degrades image quality is the level of overlay graininess that results when ink images are printed on coated media or stocks. At current media speeds in the vicinity of 850 mm/second, drying aqueous ink drops on some coated media sheets requires drying at temperatures of about 100° C.±5° C. for at least two seconds and with some media sheets longer periods of time for heat exposure would be required. Currently known inkjet printer dryers are not long enough to provide high temperature exposure for this required minimum time. Adding additional dryers in series to increase the length of the dryer and the time that the media sheets are within the dryers is not feasible as these additional dryers add considerable expense to the price of the printers and substantially increase the footprint of the printer. Reducing the effect of media coating on ink image quality during aqueous ink image printing without these adverse impacts would be beneficial.

SUMMARY

An image dryer for a color inkjet printer is configured to move media sheets bearing aqueous ink images vertically through the image dryer to expose the media sheets to temperatures of about 100° C.±5° C. for at least two seconds before returning the media sheets to a media transport that carries the sheets through the inkjet printer. The image dryer includes a housing having a first opening configured to receive media sheets from a media conveyor and a second opening that is vertically displaced from the first opening at a position that is higher than the first opening; and a media conveyor configured to move the received media sheets within the housing from the first opening to the second opening.

An inkjet printer is configured with an image dryer that moves media sheets bearing aqueous ink images vertically through a dryer that is configured to expose the media sheets to temperatures of about 100° C.±5° C. for at least two seconds before returning the media sheets to a media transport that carries the sheets through the inkjet printer. The inkjet printer includes at least one printhead; a media transport for moving a media sheet through a print zone opposite the at least one printhead in a process direction; an image dryer that follows the at least one printhead in the process direction. The image dryer having a housing having a first opening configured to receive media sheets from a media conveyor and a second opening that is vertically displaced from the first opening at a position that is higher than the first opening; and a media conveyor configured to move the received media sheets from the first opening to the second opening within the housing.

BRIEF DESCRIPTION OF THE DRAWINGS

The foregoing aspects and other features of an image dryer and an inkjet printer that moves media sheets bearing aqueous ink images vertically through a dryer that is configured to expose the media sheets to temperatures of about 100° C.±5° C. for at least two seconds before returning the media sheets to a media transport that carries the sheets through the inkjet printer are explained in the following description, taken in connection with the accompanying drawings.

DETAILED DESCRIPTION

Figure 1:
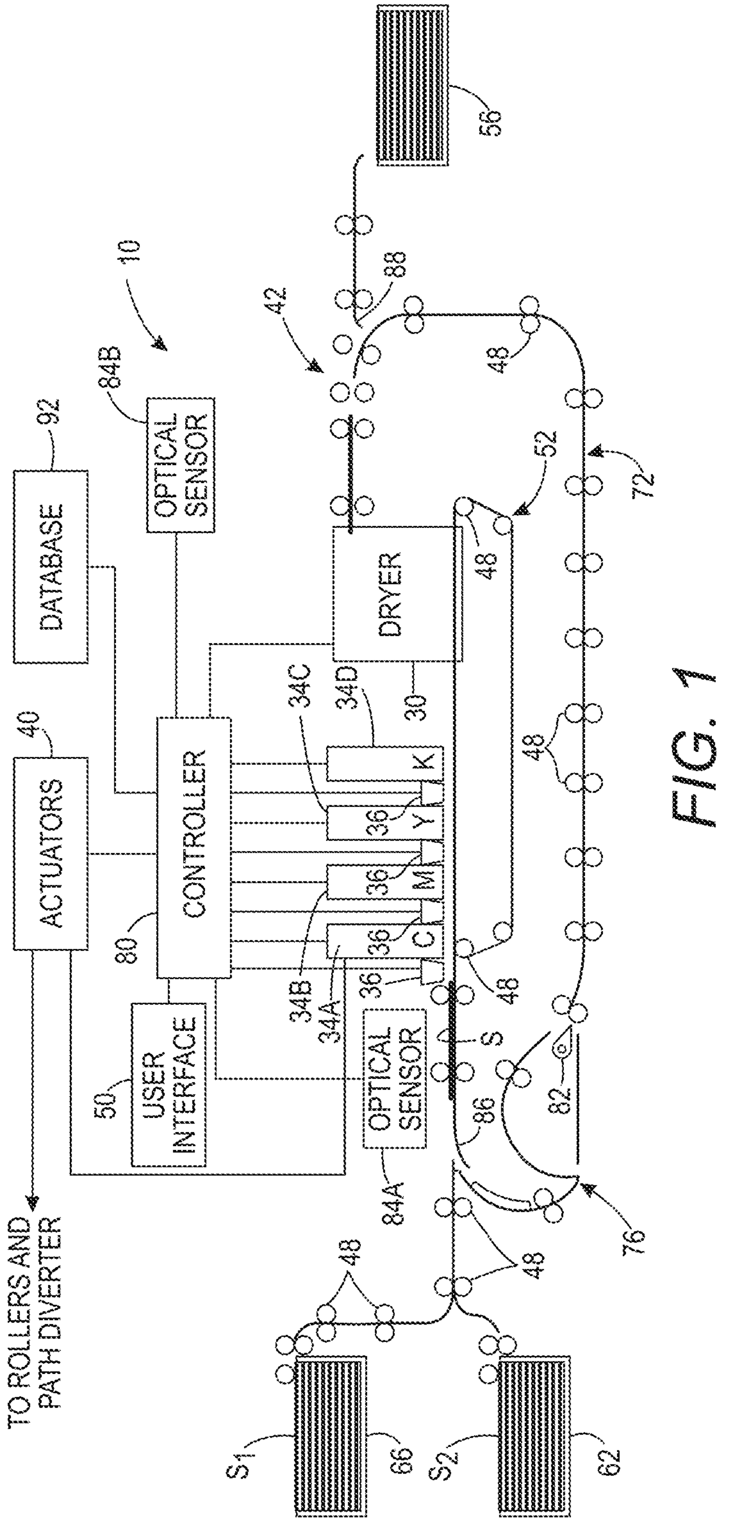
FIG. 1 is a schematic drawing of a color inkjet printer that is configured with a media sheet dryer that moves media sheets bearing aqueous ink images vertically through the dryer to expose the media sheets to temperatures of about 100° C.±5° C. for at least two seconds before returning the media sheets to a media transport that carries the sheets through the inkjet printer.

For a general understanding of the environment for the printer and the printer operational method disclosed herein as well as the details for the printer and the printer operational method, reference is made to the drawings. In the drawings, like reference numerals have been used throughout to designate like elements. As used herein, the word "printer" encompasses any apparatus that ejects ink drops onto media to form ink images.

The printer and method described below direct printed sheets into a dryer that moves the printed sheets vertically through the dryer and then places the dried sheets onto a media transport. The vertical structure of the dryer does not require the footprint of the inkjet printer to expand while increasing the dwell time of the printed sheets in the dryer.

FIG. 1 depicts a high-speed color inkjet printer 10 that is configured to dry fully or partially printed ink image on media sheets without expanding the footprint of the printer over previously known printers while increasing the dwell time of the printed sheets within the dryer. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to pulleys or to at least one driving pulley of conveyor 52 that comprises a portion of the media transport 42 that passes through the print zone PZ of the printer. As used in this document, the term "partial ink image" or "partially printed image" means an ink image on a media sheet that contains less than all of the color separations needed to print an ink image that corresponds to all of the ink image content data for an image. As used in this document, the term "print zone" means the portion of the media transport that is opposite any of the printhead assemblies in the printer.

The printer 10 is configured to perform print jobs sent to the printer by an external data source. As used in this document, the term "print job" means ink image content data for a series of ink images to be produced by a printer and the print job parameters at which the printer is operated to produce the ink images. The ink image content data is sent to the controller 80 from either an external data source, such as a scanning system or an online or work station connection. The ink image content data is processed to generate the inkjet ejector firing signals delivered to the printheads in the modules 34A-34D. Along with the ink image content data, the controller also receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, media manufacturer, and the like for executing a print job. As used in this document, the term "print job parameters" means non-image content data for performing a print job and the term "ink image content data" means digital data that identifies a color and a volume of each ejected ink drop that forms pixels in the ink images to be printed on the media sheets produced by a print job.

In one embodiment, each printhead module of the printer 10 has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

The media transport 42 includes a belt for moving print media, such as paper sheets, envelopes, or any other article suitable for receiving printed images, through the print zone so the printheads can eject ink drops onto the moving media to form printed images on the media. The belt has holes in it and the belt moves over a vacuum plenum within the conveyor 52 so a suction force can be generated through the surface of the belt. Each print medium engages a portion of the holes on the surface of the belt and the suction force holds the print medium to the surface of the belt to prevent the print media from slipping or otherwise moving relative to the surface of the belt as the belt moves through the printer. Holding each print medium in place relative to the surface of the moving belt enables the printer to control the timing of the operation of printheads to ensure that the printheads form printed images in proper locations on each print medium and ensures that the print media do not cause jams or other mechanical issues with the printer. In large-scale printer configurations, the belt often carries multiple print media simultaneously.

With continued reference to FIG. 1, a fully or partially printed media sheet enters into an image dryer 30 after the ink image is printed on a sheet S. As described in more detail below, the sheet lands on a shelf that moves vertically within the dryer, and then exits the dryer at the upper end of the dryer. The image dryer 30 can include an infrared heater, a heated air blower, air returns, or combinations of these components to heat the ink image and at least partially fix an image to the sheet. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

A return path 72 is provided to receive a sheet from the media transport 42 after a substrate has been completely or partially printed and passed through the dryer 30. The sheet is moved by the rotation of pulleys in a direction opposite to the direction of movement in the process direction past the printheads. An actuator 40 operatively connected to pivot 88 is operated by the controller 80 to either block entry to the return path 72 and direct the media to the receptacle 56 or direct the media to the return path 72. At position 76, the substrates on the return path 72 can either be turned over so they can merge into the job stream being carried by the media transport 42 and the opposite side of the media sheet can be printed or left as they are so the printed side of the sheet can be printed again. To leave the sheets as they are, the controller 80 operates an actuator to turn pivot 82 counterclockwise to the position shown in the figure so the sheets bypass the bend in the return path and are directed to position 76 without being turned over. Thus, the printed side of the sheet can be printed. If the controller 80 operates the actuator to turn pivot 82 clockwise, then the sheet goes over the bend and is flipped before being returned to the transport path 42.

The printer 10 is configured with two optical sensors 84A and 84B. The optical sensor 84A that precedes the print zone in the process direction is used to generate image data of partially printed ink images returned to the media transport 42 for a second pass of the media sheet through the print zone for completion of the ink image. The optical sensor 84B that follows the dryer 30 in the process direction is used to generate image data of completely printed and partially printed ink images that have passed through the dryer. The controller is configured to process the image data from optical sensor 84B to determine whether the heater components in the dryer 30 need to be adjusted. The optical sensors 84A and 84B can be a digital camera, an array of LEDs and photodetectors, or other devices configured to generate image data of a passing surface.

As further shown in FIG. 1, the printed media sheets S not diverted to the return path 72 are carried by the media transport to the sheet receptacle 56 in which they are be collected. While FIG. 1 shows the printed sheets as being collected in the sheet receptacle, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, the dryer 30, and the optical sensors 84A and 84B. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image content data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in non-transitory, computer-readable memory associated with the processors or controllers. The processors, their memories, the instructions and data stored in the memories, and the interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, ink image content data for an ink image to be produced is sent to the controller 80 from either a scanning system or an online or work station connection. The ink image content data is processed to generate the inkjet ejector firing signals delivered to the printheads in the modules 34A-34D. Along with the ink image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer.

Figure 2:
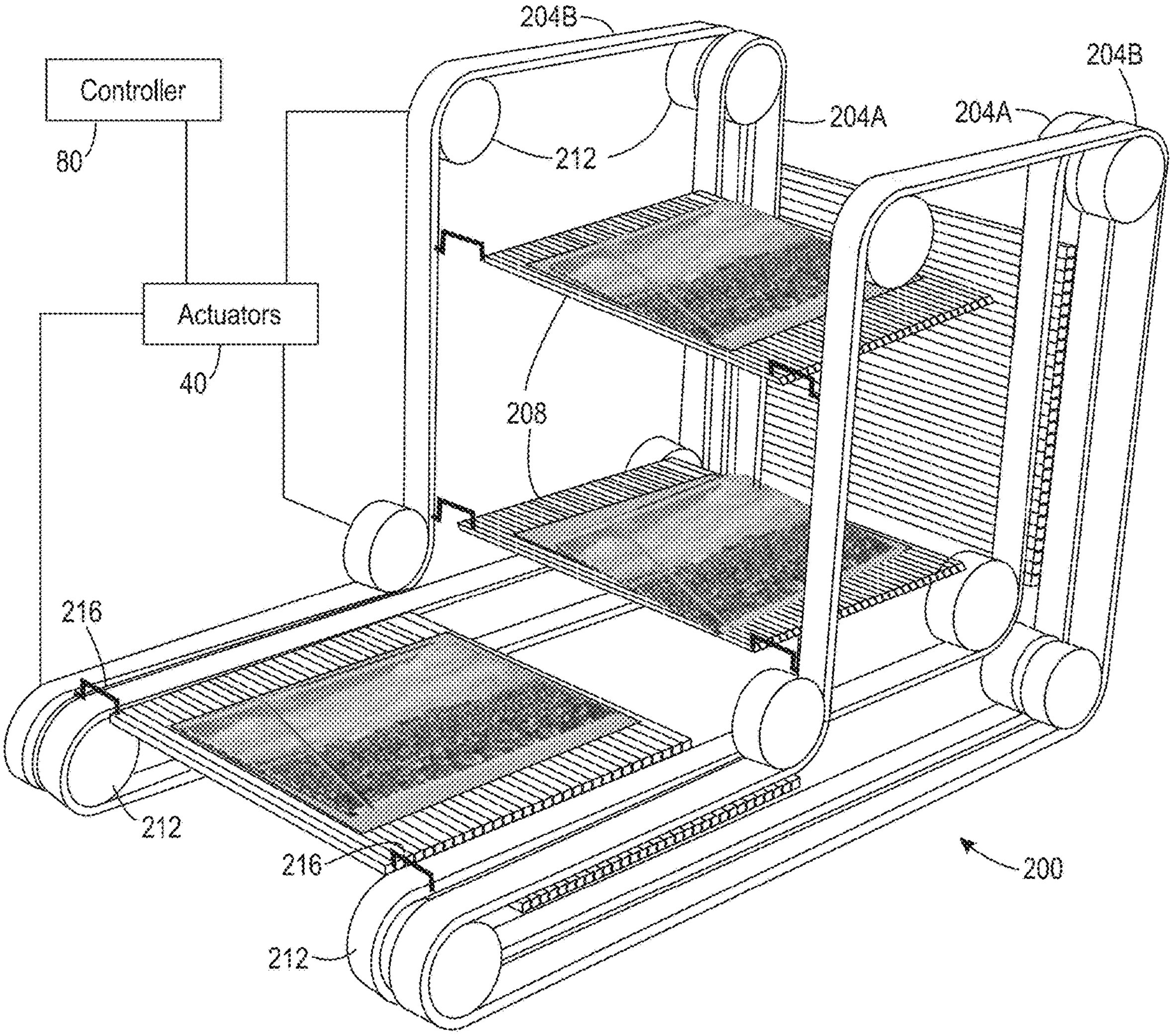
FIG. 2 is a front perspective drawing of a printed media conveyor within dryer 30 of the printer 10 shown in FIG. 1.

The conveying mechanism 200 for vertically transporting sheets through the dryer 30 is shown in FIG. 2. The housing for the dryer 30 and the heating elements mounted to the interior walls of the housing are not shown to simplify the figure. The mechanism 200 includes a first pair of endless belts 204A, a second pair of endless belts 204B, a plurality of articulated shelves 208, and a plurality of pulleys 212. The pulleys 212 are operatively connected to actuators 40 that are operated by controller 80. All or a subset of the pulleys 212 are operatively connected to the actuators 40 so the pulleys are rotated about their center axes. In embodiments where only some of the pulleys are connected to actuators, the remaining pulleys are rotated about their center axes by the tension of the belts as they rotate over the driven pulleys 212.

Figure 3:
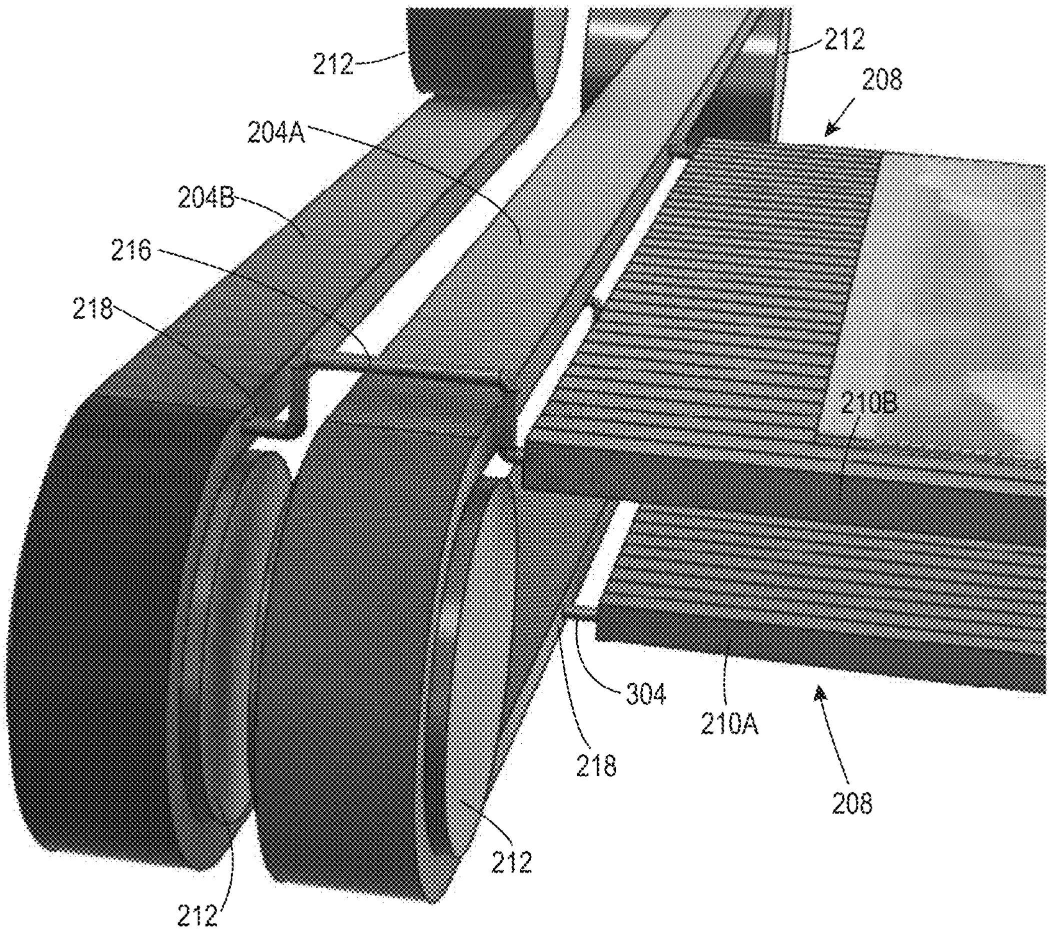
FIG. 3 depicts the engagement of a leading edge segment of an articulated shelf shown in FIG. 2 and the engagement of a trailing edge segment of an articulated shelf with the belts 204A and 204B shown in FIG. 2.

As shown in FIG. 3, a leading edge segment 210A of an articulated shelf 208 has a pin 304 protruding from it in the cross-process direction. As used in this document, the word "shelf" means a structure capable of supporting a media sheet and engaging endless belts for moving the structure within an image dryer. One end of the pin 304 is received in an aperture 218 in one of the belts in belt pair 204A. In like manner, another pin extends from the opposite end of the segment 210 and is received within an aperture in the other belt of the belt pair 204A. Similarly, a trailing edge segment 210B of another shelf 208 has a U-shaped bracket 216 that extends from the trailing edge segment. The outermost end of the U-shaped bracket engages an aperture 218 in one of the belts in the belt pair 204B. The central portion of the U-shaped bracket 216 is elevated so it can cross the adjacent belt in the belt pair 204A without engaging the belt. Thus, each end of the leading edges 210A of each shelf 208 is coupled to one of the belts in the belt pair 204A and each end of the trailing edges 210B of each shelf 208 is coupled to one of the belts in the belt pair 204B. Because the shelves are configured with articulated joints between the segments that enable the segment members of the shelves to pivot with respect to the preceding and following segment members, the shelves follow the belts as they rotate over the circumference of the pulleys 212. Alternatively, the shelves can be made of a flexible material, such as a polymer sheet, to accomplish the same purpose.

With reference again to FIG. 2, a printed sheet enters dryer 30 encounters the leading edge segment of a shelf 208 as the leading edge segment has reached the highest point on the pulleys 212 about which the belt pair 204A is rotating. This leading edge segment is moved forward by the pins 304 in the belts of belt pair 204A until the shelf becomes horizontal as shown in FIG. 2 with the printed media being supported by the shelf. As the trailing edge segment of the articulated shelf 208 reaches the highest point of the circumference of the pulleys 212 at the entrance to the dryer 30, the U-shaped brackets 216 cause the trailing edges of the shelves to move with the belts in the belt pair 204B as shown in FIG. 2. The pins 304 at the leading edge of this shelf pass under the third set of pulleys 212 and the leading edge of the shelf is carried by the belt pair 204 upwardly. When the trailing edge segment reaches the next set of pulleys 212, the outermost ends of the U-shaped brackets 216 in the cross-process direction slip underneath the pulleys. As these ends of the U-shaped brackets pass the lowest point on the circumference of this pulley, the belt pair 204B begins to lift the trailing edge of the shelf 208 upwardly. The horizontal shelf 208 continues upwardly until it reaches the highest point on the circumference of the highest pulleys in the dryer 30. At that point, the engagement of the pins 304 with the belts in the belt pair 204A begin to follow the circumference of the pulleys and the leading edge segment bends around the pulleys. This action separates the media sheet from the shelf and moves the media sheet to the exit of the dryer 30. The trailing edge of the shelf 208 propels the media sheet out of the dryer until the trailing edge begins to follow the circumference of the fifth pulley pair and bends over these pulleys to follow the leading edge in its vertical descent. At the sixth pulley pair, the leading edge follows the circumference of the pulleys and is turned upside down with respect to the position of the shelf when it was carrying media sheets. As the leading edge approaches the first pulley pair, it follows the circumference of the pulleys to repeat the cycle.

Figure 4:
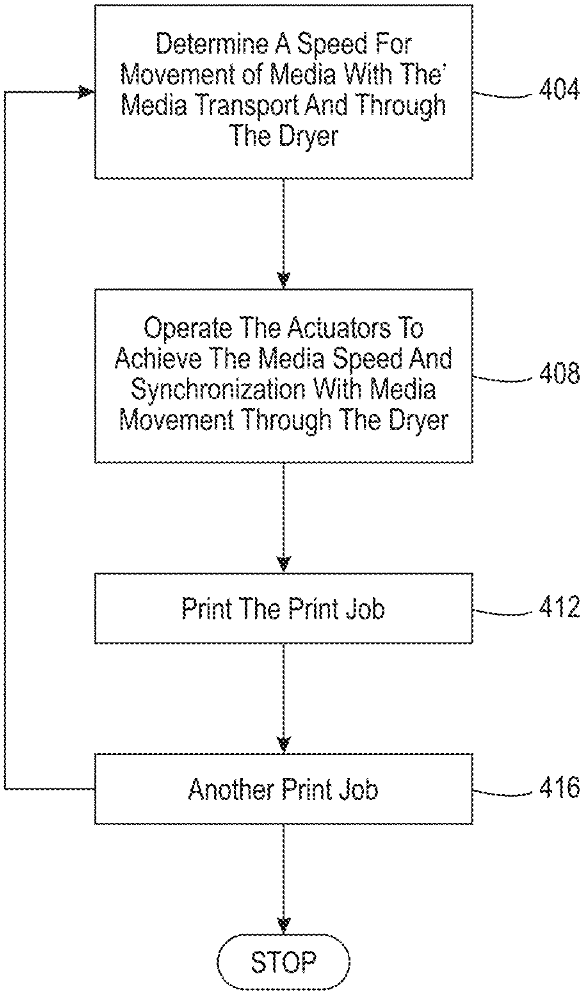
FIG. 4 is a flow diagram of a process for operating the printer of FIG. 1 to synchronize the movement of the media sheets through the dryer.

FIG. 4 is a flow diagram for a process 400 that extends the drying time for media sheets in a dryer by vertically passing the sheets through the dryer. In the discussion below, a reference to the process 200 performing a function or action refers to the operation of a controller, such as controller 80, to execute stored programmed instructions to perform the function or action in association with other components in the printer. The process 200 is described as being performed with the printer 10 of FIG. 1 for illustrative purposes.

Prior to process 200 operating the printer 10, the controller determines from the print job parameters a speed for moving the media sheets past the printheads for printing and through the dryer for fixing the ink images on the media (block 204). For example, the type and size of the media affects the drying time. The process 200 operates the actuators 40 to achieve the determined media speed on the media transport and operates the actuators to rotate the belts in the dryer to synchronize the belts in the dryer with the arrival of media sheets at the dryer and achieve the dwell time within the dryer (block 208). The print job is then printed (block 212) and the process repeats for the next print job (block 216).

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. An image dryer for an inkjet printer comprising:

a housing having a first opening configured to receive media sheets from a media conveyor and a second opening that is vertically displaced from the first opening at a position that is higher than the first opening; and a media conveyor configured to move the received media sheets within the housing from the first opening to the second opening, the media conveyor comprising a plurality of shelves, each shelf of the plurality of shelves configured to engage at least one endless belt so the plurality of shelves follow a path of rotation for the at least one endless belt.

2. The image dryer of claim 1, the media conveyor further comprising:

a first pair of endless belts;

a first plurality of pulleys about which the first pair of endless belts rotate;

a second pair of endless belts;

a second plurality of pulleys about which the second pair of endless belts rotate; and each shelf of the plurality of shelves having a first end and a second end, the first end of each shelf being configured to engage the first pair of endless belts and the second end of each shelf being configured to engage the second pair of endless belts so the first end of the shelves follow a path of rotation for the first pair of endless belts about the first plurality of pulleys and the second end of the shelves follow a path of rotation for the second pair of endless belts about the second plurality of pulleys.

3. The image dryer of claim 2 wherein a first group of pulleys in the first plurality of pulleys of the media conveyor are separated from and parallel to a second group of pulleys in the first plurality of pulleys, the first group of pulleys in the first plurality of pulleys and the second group of pulleys in the first plurality of pulleys are separated by a first distance in a cross-process direction; and a second group of pulleys in the second plurality of pulleys of the media conveyor are separated from and parallel to a second group of pulleys in the second plurality of pulleys, the first group of pulleys in the second plurality of pulleys and the second group of pulleys in the second plurality of pulleys are separated by a second distance in the cross-process direction, the second distance being greater than the first distance.

4. The image dryer of claim 3, the media conveyor further comprising:

a first pair of members extending from each shelf, each member in the first pair of members extends from the shelf on opposite sides of the shelf at the first end of the shelf, the member being configured to engage the first pair of endless belts; and a second pair of members extending from each shelf, each member in the second pair of members extends from the shelf on opposite sides of the shelf at the second end of the shelf, the member being configured to engage the second pair of endless belts without engaging the first pair of endless belts.

5. The image dryer of claim 4 wherein each member in the second pair of members for each shelf is a U-shaped member.

6. The image dryer of claim 1, each shelf further comprising:

a plurality of members that extend in a cross-process direction; and each member in the plurality of members pivots with respect to a preceding member and a following member in a process direction except for the member in the plurality of members at a leading edge of each shelf and the member in the plurality of members at a trailing edge of each shelf.

7. The image dryer of claim 1, each shelf is a flexible sheet of material.

8. The image dryer of claim 2, each endless belt of the first pair of endless belts having an aperture configured to receive outer ends of the members extending in a cross-process direction from a leading edge of each shelf.

9. The image dryer of claim 8, each endless belt of the second pair of endless belts having an aperture configured to receive an outermost leg of the U-shaped members extending in the cross-process direction from a trailing edge of each shelf.

10. The image dryer of claim 9 wherein at least one pulley in a first plurality of pulleys is configured to be driven by an actuator; and at least one pulley in a second plurality of pulleys is configured to be driven by another actuator.

11. An inkjet printer comprising:

at least one printhead;

a media transport for moving a media sheet through a print zone opposite the at least one printhead in a process direction;

an image dryer that follows the at least one printhead in the process direction, the image dryer having:

a housing having a first opening configured to receive media sheets from a media conveyor and a second opening that is vertically displaced from the first opening at a position that is higher than the first opening; and a media conveyor configured to move the received media sheets from the first opening to the second opening within the housing, the media conveyor comprising a plurality of shelves configured to retain the media sheets in a horizontal position and to move the media sheets from the first opening to the second opening within the housing.

12. The inkjet printer of claim 11, the media conveyor further comprising:

a first pair of endless belts;

a first plurality of pulleys about which the first pair of endless belts rotate;

a second pair of endless belts;

a second plurality of pulleys about which the second pair of endless belts rotate; and each shelf of the plurality of shelves having a first end and a second end, the first end of each shelf being configured to engage the first pair of endless belts and the second end of each shelf being configured to engage the second pair of endless belts so the first end of the shelves follow a path of rotation for the first pair of endless belts about the first plurality of pulleys and the second end of the shelves follow a path of rotation for the second pair of endless belts about the second plurality of pulleys.

13. The inkjet printer of claim 12 wherein a first group of pulleys in the first plurality of pulleys of the media conveyor are separated from and parallel to a second group of pulleys in the first plurality of pulleys, the first group of pulleys in the first plurality of pulleys and the second group of pulleys in the first plurality of pulleys are separated by a first distance in a cross-process direction; and a second group of pulleys in the second plurality of pulleys of the media conveyor are separated from and parallel to a second group of pulleys in the second plurality of pulleys, the first group of pulleys in the second plurality of pulleys and the second group of pulleys in the second plurality of pulleys are separated by a second distance in the cross-process direction, the second distance being greater than the first distance.

14. The inkjet printer of claim 13, the media conveyor further comprising:

a first pair of members extending from each shelf, each member in the first pair of members extends from the shelf on opposite sides of the shelf at the first end of the shelf, the member being configured to engage the first pair of endless belts; and a second pair of members extending from each shelf, each member in the second pair of members extends from the shelf on opposite sides of the shelf at the second end of the shelf, the member being configured to engage the second pair of endless belts without engaging the first pair of endless belts.

15. The inkjet printer of claim 14 wherein each member in the second pair of members for each shelf is a U-shaped member.

16. The inkjet printer of claim 11, each shelf further comprising:

a plurality of members that extend in a cross-process direction; and each member in the plurality of members pivots with respect to a preceding member and a following member in a process direction except for the member in the plurality of members at a leading edge of each shelf and the member in the plurality of members at a trailing edge of each shelf.

17. The inkjet printer of claim 11, each shelf is a flexible sheet of material.

18. The inkjet printer of claim 12, each endless belt of the first pair of endless belts having an aperture configured to receive outer ends of members extending in a cross-process direction from a leading edge of each shelf.

19. The inkjet printer of claim 18, each endless belt of the second pair of endless belts having an aperture configured to receive an outermost leg of U-shaped members extending in the cross-process direction from a trailing edge of each shelf.

20. The inkjet printer of claim 19 wherein at least one pulley in a first plurality of pulleys about which the first pair of endless belts rotate is configured to be driven by an actuator; and at least one pulley in a second plurality of pulleys about which the second pair of endless belts rotate is configured to be driven by another actuator.

* * * * *